United States Patent [19]

Wolf

[11] Patent Number: 5,352,142
[45] Date of Patent: Oct. 4, 1994

[54] METHOD OF REPROCESSING PICTURE TUBES

[75] Inventor: Jurgen Wolf, Stein, Fed. Rep. of Germany

[73] Assignee: Hetzel & Co. Elektronik-Recycling GmbH, Nurmberg, Fed. Rep. of Germany

[21] Appl. No.: 118,798

[22] Filed: Sep. 10, 1993

[30] Foreign Application Priority Data

Sep. 10, 1992 [EP] European Pat. Off. ......... 92115511.5

[51] Int. Cl.$^5$ ............................................... H01J 9/50
[52] U.S. Cl. ............................................. 445/2; 65/23
[58] Field of Search ................... 445/2, 45, 61; 65/23

[56] References Cited

U.S. PATENT DOCUMENTS

| | | | |
|---|---|---|---|
| 3,011,673 | 12/1961 | Van Zee | 445/2 |
| 3,997,311 | 12/1976 | Rogers | 445/2 |
| 4,176,891 | 12/1979 | Antonucci et al. | 445/2 |

FOREIGN PATENT DOCUMENTS

| | | |
|---|---|---|
| 3726795 | 2/1989 | Fed. Rep. of Germany . |
| 55-141038 | 11/1980 | Japan ..................... 445/2 |

OTHER PUBLICATIONS

J. P. Mohila et al., "Apparatus for Separating Envelope Parts of a Cathode–Ray Tube While In Stationary Position, " *RCA Technical Notes* TN No. 1238 (Feb. 13, 1980).
Patent Abstract of DE 3,726,795 A1, Published Feb. 23, 1989.
Patent Abstracts of Japan, vol. 9, No. 123 (E–317) (1846) May 28, 1985.

*Primary Examiner*—P. Austin Bradley
*Assistant Examiner*—Jeffrey T. Knapp
*Attorney, Agent, or Firm*—Wegner, Cantor, Mueller & Player

[57] ABSTRACT

Picture tubes are reprocessed by heating the picture tube to at least the fusing temperature of the solder at the joint and separating the screen and the cone under the influence of gravity. This method effects a clean separation of the screen and the cone by slowly heating the aerated picture tube which is arranged, during heating, in such a way that the joint between the screen and the cone is inclined with respect to the horizontal, and displacing the screen and the cone in opposite directions.

18 Claims, No Drawings

METHOD OF REPROCESSING PICTURE TUBES

FIELD OF THE INVENTION

The subject matter of the invention is a method of reprocessing or recycling picture tubes of television sets or computer terminals, and, in particular, a method of carefully reprocessing picture tubes, which makes it possible to reutilize the glass materials of the neck, cone and screen separately.

BACKGROUND OF THE INVENTION

This application claims a benefit of priority under 35 USC section 119 based on European Patent Application No. 92 115 511.5 filed Sep. 10, 1992, the entire contents of which are hereby expressly incorporated by reference into the present application.

Within this application several publications are referenced, and the disclosures of these publications in their entireties are hereby expressly incorporated by reference into this application.

With the ordinance planned by the Federal Government on the avoidance, reduction and utilization of used electrical appliance refuse and electronics refuse (Electronic Scrap Ordinance) the reprocessing and utilization of picture tubes of television sets and computers has been dealt with in various ways. The major portion, in terms of weight, of this are the picture tubes which are, in most cases, prepared from different sorts of glass, since only smaller picture tubes are occasionally made in one piece only, that is, without any joint of the screen and the cone. The majority of such picture tubes, that is, cathode ray picture tubes, consist of three parts, that is, the screen which, when applied in accordance with the intended use, faces the viewer; the cone connected with the screen; and the neck, these three parts consisting, in detail, of different glass types. For instance, generally, the screen, or the tub shaped front part of the picture tube, is prepared from a specially designed glass type, which must exhibit high mechanical strength, be free from bubbles, because these would to a very great extent interfere with the picture written on the fluorescent screen, and, in addition, must be capable of absorbing the soft X-radiation created at the occurrence of the electron beams, and of keeping this radiation safely away from the viewer. Lead-containing glass types are not suitable for this purpose, since they change to brown color, when being bombarded with electron beams. The screen therefore generally consists of a barium-containing glass. The cone is generally fabricated from a lead-containing glass, whilst the neck is prepared from a glass enabling good lead-through of the metal parts. The picture tubes contain, on the inside of the screen, a fluorescent material; in the case of color picture tubes, fluorescent materials in the three requisite colors are present, which, combined with a shadow mask disposed in the area of the screen, enable the creation of a color picture.

It has already been known that picture tubes of this kind can be crushed by means of a shredder, the metal parts can be separated, the fluorescent materials can be flushed out, and the comminuted glass residues can be deposited on dumps.

As it must be expected that, in the Federal Republic of Germany, almost 5 million picture tubes from television sets and computer monitors will be discarded and scrapped each year, there is a strong need to recover the valuable components, in particular, the glass, of those picture tubes.

Now, in order to attain optimal and high-grade utilization, it is necessary, that one should obtain carefully sorted glass materials, which can only be accomplished by disintegrating the picture tubes in such fashion that mixing of the glass materials, especially mixing of the glass of the screen with that of the cone, is avoided.

Separating the neck is relatively easy. After the picture tube has been aerated, and after the metal parts contained in the neck have been removed, the neck can be removed by being knocked off mechanically, fused off, given a cut with a saw and broken off, or by being burst off. Due to the small portion of glass contained in the neck, an economical separating procedure should be given preference here.

What is more essential is the separation of the screen and the cone, since these two parts of the picture tube comprise the major glass portion.

Attempts have already been made to strike the cone material off the screen by means of a resonator rod or a hammer-shaped device. By this, however, a neat separation of the different glass types is often impossible in that the picture tubes often burst and fall to pieces in an undesirable manner.

Separating the cone from the screen by blasting it off is another possibility. This can be effected by means of an electrically heated flattened wire or round wire, by on-spraying a material which is ignited and burns with a lot of heat being developed, by applying a wick soaked in an appropriate combustible liquid and lighting the wick, as well as by heating with an annular burner run with a gas/oxygen mixture. These methods not only are laborious but often fail to result in a clean separation of the cone and the screen, since the glass material, due to the high thickness, displays considerable stresses which often cause breaking of the picture tube and, thus, preclude a reproducible separation of the glass materials.

Another possibility resides in separating the cone and the screen of the picture tube by cutting with a diamond saw, whereby, advantageously, the joint of the cone and the screen is cut through with two saws from both sides simultaneously. This method is also laborious and costly, and, therefore, cannot be satisfactory either.

From DE-A-37 26 795 there is known a method of opening an evacuated electron tube having an electrode which is highly sensitive to impurities, in particular the photocathode of an image intensifier tube, which method comprises the steps of heating the soldered seam of the evacuated electron tube in an evacuated chamber to at least the fusing temperature of the solder and then causing opening of the soldering gap by means of a mechanical impulse. In this, the tube can be arranged in the vacuum chamber in such a way that the two tube parts forming the soldered seam move away from one another by a predetermined distance under the influence of the mechanical impulse and gravity, so that the suspended part of the vacuum jacket of the tube will fall on the support disposed at a lower distance therebelow. The electron tubes in question are special image intensifier tubes comprising a photocathode and a fluorescent screen as well as, optionally, in addition, a four-channel secondary electron multiplier; in the case of these there is a considerable need to recover the complex, or also faulty, electrons undestroyed. These electron tubes have an annular or disk-shaped soldered seam which connects the parts of the vacuum jacket and consists of indium, that is, a metallic solder which melts at 157° C. and, thus, at much lower temperatures than the glass solders conventionally employed in the manufacture of cathode ray tubes.

From Patent Abstracts of Japan. Vol. 9. No. 123 (1985) (JP-A 60 10 545) it is already known that picture tubes can be recovered in that the picture tube is immersed in nitric acid in order to decompose and remove the glass solder area at the joint between the screen and the cone, whereupon these two parts can be separated then by on-spraying hot water.

Lastly. U.S. Pat. No. 4,176,891 describes a method of reprocessing picture tubes, which also comprises the steps of cauterizing the outer region of the glass solder and subsequently bursting the picture tube at the joint by applying a thermal shock.

The latter method cannot be satisfactory in particular on account of the use of acids, since the acids have to be collected and reused.

Further, it has been found that the glass of picture tubes, in particular of television picture tubes, develops stresses, and becomes more brittle, in the course of its use, under the influence of the cathode ray and the different temperatures which occur, so that the glasses, when exposed to the action of mechanical forces, are very likely to break, and form long cracks, in an undesirable manner, so that irregular glass fragments will result, processing of which is not only difficult but also hazardous to the operating personnel on account of the sharp broken edges.

SUMMARY OF THE INVENTION

The present invention is directed to heating the picture tube to at least the fusing temperature of the solder at the joint and separating the screen and the cone under the influence of gravity, wherein a clean separation of the screen and the cone is effected by slowly heating the aerated picture tube which is arranged, during heating, in such a way that the joint between the screen and the cone is inclined with respect to the horizontal, and displacing the screen and the cone in opposite directions.

An object of the present invention is to provide a method of reprocessing picture tubes, which makes possible, in easy fashion, a neat and clean separation of the glass materials of the cone and the screen of the picture tubes, so that it will become possible then to carry out the further processing of the remaining components of the picture tubes, such as separating the electrodes and the shadow mask and, in particular, washing out and recovering the fluorescent materials, without causing hazards to the personnel.

Other objects, advantages and features of the present invention will be more readily appreciated and understood when considered in conjunction with the following detailed description as drawings.

DESCRIPTION OF THE PREFERRED EMBODIMENTS

All the disclosed embodiments can be made using conventional compounds and procedures without undue experimentation. All the disclosed embodiments are useful.

Since these methods of recovering the component parts of the picture tube cannot be satisfactory in particular on account of the use of acids, the object of the present invention is to provide a method of reprocessing picture tubes, which makes possible, in easy fashion, a neat separation of the glass materials of the cone and the screen of picture tubes.

It has been found that this object can be accomplished in that, by slowly heating the aerated picture tube to at least the fusing temperature of the glass solder at the joint between the cone and the screen, and by displacing the cone and the screen under the influence of gravity, a clean separation of the cone and the screen is effected if the joint between the screen and the cone is inclined with respect to the horizontal.

The subject matter of the invention therefore is the method as claimed in claim 1. The dependent claims relate to preferred embodiments of this subject matter of the invention.

The method according to the invention comprises the steps of first aerating the picture tube, for instance by drilling a hole into it or by removing the neck; and subsequently, effecting a clean separation of the screen and the cone by slowly heating the aerated picture tube, which, during heating, is arranged in such a way that the joint between the screen and the cone is inclined with respect to the horizontal, so that the separation is achieved by displacing the screen and the cone in opposite directions.

Advantageously, the heating is carried out to a temperature which is at or above the fusing temperature of the glass solder but below the fusing temperature of the glass of the screen and of the cone, respectively.

According to a preferred embodiment of the invention the picture tube is first heated to a predetermined temperature during a predetermined heating-up time, then held at this temperature during a predetermined holding time, and finally, cooled to a temperature below 120° C. within a predetermined period. By this, tempering of the glass material of the picture tube is achieved, as a consequence of which not only a cleaner separation of the picture tube and the cone becomes possible but the stresses present are removed from the, partly considerably thick glass, so that the undesired formation of cracks and fissures is avoided in this reprocessing procedure and in the subsequent further processing of the neatly separated glass components of the picture tube, respectively.

According to a preferred embodiment of the invention the heating is therefore carried out to the fusing temperature of 530° to 580° C., preferably 550° to 570° C., with a heating-up time of 60 to 300 minutes, preferably 120 to 210 minutes.

After running through this heating-up time, and after attaining the stated temperature, the picture tube is held at the attained temperature during a holding time of 30 to 60 minutes, preferably 40 to 45 minutes. Advantageously, the temperature adhered to during the holding time is in the range of from 530° to 580° C. more preferably in the range of from 560° to 570° C.

At the end of the holding time, the picture tube is cooled to a temperature below 120° C. in the course of 1 to 6 hours, preferably 3 to 5 hours.

Surprisingly, it has been found that it is possible to effect the displacing of the screen and the cone of the picture tube under the influence of gravity alone, and without applying any mechanical impulses, namely in that the picture tube, during heating, is arranged in such a way that the plane of the joint between the screen and the cone is inclined with respect to the horizontal. During heating of the picture tube to a temperature at or above the fusing temperature of the glass solder, the upper part of the picture tube slides off on the usually plane and straight joint under the influence of gravity, so that the cone and the screen can be separated from one another cleanly and without difficulty.

This was not to be expected, because the joining surfaces of the screen and the cone normally are polished or lapped in order to yield a smooth glass soldering surface onto which the glass solder is applied then, whereupon the complemented components of the picture tube, VIZ the screen, on the one hand, and the cone, on the other hand, are put together at a temperature of about 400° C. in such a way that the necessary adjustment particularly of the electrodes contained in the neck tube, and of the screen and the shadow mask, respectively, is achieved. The glass solder which usually is a mixture of several metal oxides and vitrifiers usually has a lower melting point than the glasses to be joined, and, in this case, firmly connects the screen and the cone, whereby, due to the polished, and lapped, respectively, joining surfaces of the cone and of the screen, respectively, only a very thin glass solder layer is present. Now, since, during heating, volatile components of the glass solder evaporate and a strong connection of the glass solder components with the glass materials of the screen and of the cone, respectively, is effected, it must be regarded no doubt surprising that by heating the picture tube to a temperature above the softening point of the glass solder, displacement of the screen and the cone in opposite directions on the plane of the joint becomes possible.

According to a preferred embodiment of the invention, the picture tube is disposed, in inclined position, in a holding device, with the side of the screen facing downwards, and led through a heating chamber in such a way that the temperature and duration of heating are adjusted such that the above-mentioned heating-up times, holding times and cooling times are attained, so that after the holding device, which is preferably continuously guided through the heating chamber, has left the chamber, a clean separation of the screen and the cone of the picture tube is attained in that the cones, which have slid off the screen disposed downwardly, are collected in a corresponding holding device, so that a neat separation of the glass materials of the screen and the cone of the picture tube is achieved.

In the method according to the invention, the neck of the picture tube can be removed during aeration, or thereafter.

The method according to the invention offers the further advantage that, when the picture tube is being led through the heating chamber, with the above-stated heating-up times, holding times and cooling times at the defined temperatures being adhered to, the glass material is tempered and loses its stresses and brittleness, so that it will not be susceptible to forming random cracks, as a result of which a clean separation of the screen and the cone is made possible. In this way, the subsequent recycling of the component parts of the picture tube, that is, the metal materials, the fluorescent material and the different glass materials of the screen and the cone, become possible in an easy fashion involving no hazards; the latter being due to the fact that the separation of the screen and the cone is effected at the joint and that no sharp-edged sites of break are caused in the glass.

In carrying out the method according to the invention, the temperature control is preferably accomplished according to the above-described program, until the melting temperature of the glass solder is achieved, or slightly exceeded, respectively. After separation has been accomplished by displacing the two components, VIZ the screen and the cone, which displacing is effected exclusively under the influence of gravity, the separated glass material can be cooled. The heating chamber is preferably operated under normal pressure.

Advantageously, the heating chamber employed according to the invention consists of so called lightweight components, which have a very low heat capacity and provide excellent insulation, so that losses of energy are low.

Furthermore, it is advantageous to pass the atmosphere of the heating chamber into the cycle, and, optionally, filter it in order to prevent undesired materials from emerging into the atmosphere.

While there is shown and described herein certain specific structures embodying this invention for the purpose of clarity of understanding, the same is to be considered as illustrative in character, it being understood that only preferred embodiments have been shown and described. It will be manifest to those skilled in the art that certain changes, various modifications and rearrangements of the parts may be made without departing from the spirit and scope of the underlying inventive concept and that the same is not limited to the particular forms herein shown and described except insofar as indicated in the scope of the appended claims.

The entirety of everything cited above or below is expressly incorporated herein by reference.

What is claimed is:

1. A method of reprocessing a picture tube having solder at a joint between a screen and a cone wherein each of said screen and said cone comprises a glass material, said method comprising:
   aerating the picture tube;
   heating the picture tube to at least the fusing temperature of the solder at the joint; and
   separating the screen and the cone under the influence of gravity,
   wherein a clean separation of the screen and the cone is effected by slowly heating the aerated picture tube which is arranged, during heating, in such a way that the joint between the screen and the cone is inclined with respect to the horizontal, and displacing the screen and the cone in opposite directions.

2. The method of claim 1, wherein the picture tube is disposed, in inclined position, with the side of the screen facing downwards, in a holding device, and led through a heating chamber.

3. The method of claim 1, wherein the neck of the picture tube is removed during aeration, or thereafter.

4. The method of claim 1, wherein the picture tube is inclined at an angle of 10° to 30°.

5. The method of claim 4, wherein the picture tube is inclined at an angle of 15° to 20°.

6. The method of claim 1, wherein the picture tube is heated to a temperature at or above the fusing temperature of the solder but below the fusing temperature of the glass of the screen and of the cone, respectively.

7. The method of claim 6, wherein the heating to the fusing temperature is carried out with a heating-up time of 60 to 300 minutes.

8. The method of claim 3, wherein the heating to the fusing temperature is carried out with a heating-up time of 120 to 210 minutes.

9. The method of claim 7, wherein the heating-up time is followed by a holding time of 30 to 60 minutes at the temperature attained.

10. The method of claim 9, wherein the heating-up time is followed by a holding time of 40 to 45 minutes at the temperature attained.

11. The method of claim 7, wherein during the course of the heating-up time, the picture tube is heated to a temperature of from 530° C. to 580° C.

12. The method of claim 11, wherein during the course of the heating-up time, the picture tube is heated to a temperature of from 550° C. to 570° C.

13. The method of claim 6, wherein the heating to the fusing temperature is carried out with a heating-up time and is followed by a holding time of 30 to 60 minutes at the temperature attained.

14. The method of claim 13 where the holding time is 40 to 45 minutes.

15. The method of claim 13, wherein the temperature that is maintained during the holding time is in the range of from 530° C. to 580° C.

16. The method of claim 15, wherein the temperature that is maintained during the holding time is in the range of from 560° C. to 570° C.

17. The method of claim 13, wherein at the end of the holding time the picture tube is cooled to a temperature below 120° C. in the course of at least three hours.

18. The method of claim 17, wherein at the end of the holding time the picture tube is cooled to a temperature below 120° C. in the course of at least four hours.

* * * * *